Feb. 18, 1964 J. M. GIZDICH 3,121,416
PORTABLE AUTOMOBILE STOP SIGNAL
Filed Aug. 8, 1963
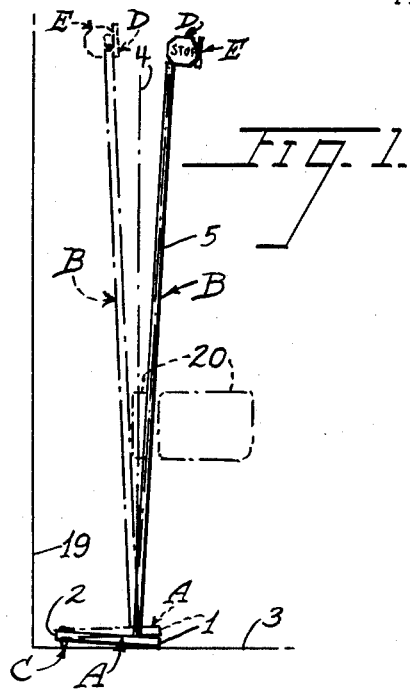
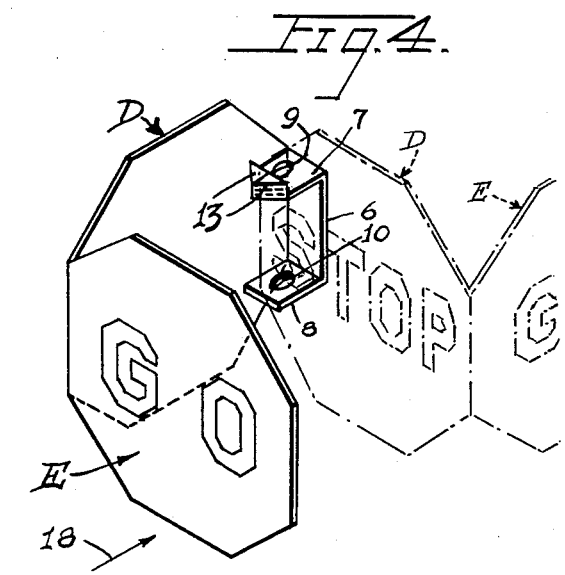
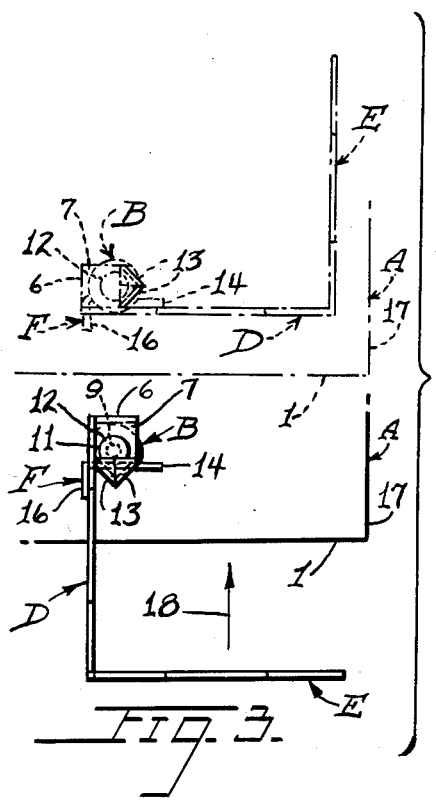
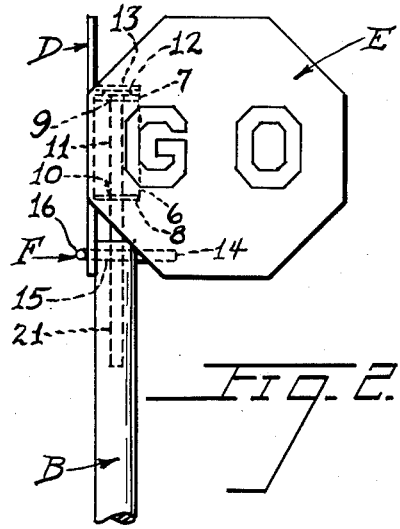
INVENTOR
JERRY M. GIZDICH
BY William R. Piper
ATTORNEY

United States Patent Office 3,121,416
Patented Feb. 18, 1964

3,121,416
PORTABLE AUTOMOBILE STOP SIGNAL
Jerry M. Gizdich, 2511 Oaks Drive, Hayward, Calif.
Filed Aug. 8, 1963, Ser. No. 300,895
5 Claims. (Cl. 116—28)

The present invention relates to improvements in a portable automobile stop signal and it consists in the combinations, constructions and arrangement of parts hereinafter described and claimed.

An object of my invention is to provide a portable automobile stop signal that can be placed at any desired position on a supporting surface and does not need to be secured in place by any fastening means. For example, if a clothes washing machine is placed at the inner end of a garage, the device can be positioned in front of the washer and will be actuated by the bumper of the automobile entering the garage and contacting the device to present a Stop signal viewable to the driver. The driver will then immediately stop his car and the car will not damage the washer. When the washing machine is used, the device can be moved so as not to be in the way. After the washing operation is completed, the device can be again placed in front of the washer to protect it from being damaged by the car entering the garage.

A further object of my invention is to provide a device of the type described which makes use of gravity for bringing the Stop signal into view of the driver when his car contacts the device. The signal portion of the device is made to resemble two signals which are Go and Stop. When the device is not contacted by a car, the Go signal will be in view and the Stop signal will be out of view of the driver of the car as the car enters the garage. The device is placed where the car should stop. When the car contacts the device, the Stop-Go signal will be actuated so that gravity will move the Go signal out of the line of vision of the driver and will move the Stop signal into a position where it will be in the line of vision of the driver.

A further object of my invention is to provide a device of the type described which is simple in construction and is durable and efficient for the purpose intended.

Other objects and advantages will appear as the specification continues. The novel features of the invention will be set forth in the appended claims.

For a better understanding of my invention, reference should be made to the accompanying drawing, forming part of this specification, in which:

FIGURE 1 is a side elevation of the device shown about one eighth full size.

FIGURE 2 is a front elevation of the Stop-Go signal portion of the device and is shown full size.

FIGURE 3 is a top plan view of FIGURE 2 and shows the Stop-Go signal in two of its positions.

FIGURE 4 is an isometric view of the Stop-Go signal portion of the device, shown in two positions.

While I have shown only the preferred form of my invention, it should be understood that various changes, or modifications, may be made within the scope of the annexed claims without departing from the spirit thereof.

Detailed Description

In carrying out my invention I provide a portable automobile stop signal that comprises a base A that may be rectangular in shape. A rod or pole B is mounted near the right hand end 1 of the base A, when looking at FIGURE 1, and the axis of the rod extends at right angles to the plane of the base. A rocker or fulcrum which may comprise two nails C extending through the base A and having their ends projecting below the underside of the base, is placed near the left hand end 2 of the base. The base A, when supported by a garage floor 3, will be inclined downwardly at a slight angle due to the spaced apart nails C raising the left hand end of the base a slight distance above the floor. This will cause the upstanding rod or pole B to be inclined slightly to the right in FIGURE 1 of a vertical dot-dash line 4 that intersects the longitudinal axis 5 of the rod at its point of juncture with the base. The purpose for inclining the base A downwardly and for inclining the rod B at an angle to the vertical will be explained hereinafter. The two spaced apart nails C and the lower corner of the edge 1 of the base A will provide a three point support for the base.

At the top of the rod B, I swingably mount a Stop-Go signal. This signal is preferably made of metal and it consists of a flat sheet formed into two hexagonally-shaped frames D and E, that are bent to extend at right angles to each other, see FIGURE 4. The frame D has the word Stop printed thereon, see FIGURE 1 and the frame E has the word Go printed thereon, as shown in FIGURES 2 and 4. If desired the color of the background of the Stop signal may be red while the color of the background of the Go signal may be green. The Stop-Go signal is mounted on the pole B which may be colored white and the base A may be colored black. In this way my device resembles the usual Stop-Go signals provided at certain street intersections.

The means for swingably mounting the Stop-Go signal at the top of the rod B is shown in FIGURES 2, 3, and 4. The hexagonal frame D has an extension 6 that is bent at right angles to the plane of the frame, see FIGURE 4, and the extension 6 has integral upper and lower ears 7 and 8 that are bent at right angles to the plane of the extension. The upper ear 7 has an opening 9 that is aligned with an opening 10 in the lower ear 8. A nail 11 is inserted in the aligned openings 9 and 10 and the shank of the nail is dropped into a bore that extends into the upper end of the rod B for a short distance, as shown in FIGURE 2. A good portion of the nail shank projects beyond the top of the rod B. The nail head 12 has its under surface disposed just above the upper surface of the ear 7. The upper ear 7 has integral triangular portions 13 that are bent to overlie the top of the nail head 12, see FIGURE 2. These triangular portions 13 support the Stop-Go signal on the nail head 12. The nail 11 is free to rotate within the bore 21 and the lower end of the nail rotates on the bottom of the bore like a bearing. I am illustrating one way for swingably supporting the Stop-Go signal. The nail 11 will support the Stop-Go signal at the correct elevation while permitting it to swing between the full and the dot-dash line positions shown in FIGURES 3 and 4.

An L-shaped stop member F has an arm 14 extending through a horizontal bore 15 in the rod B, see FIGURES 2 and 3. The arm 14 projects beyond the rod and parallels the edge 1 of the base A, and acts as a stop arm for the Stop-Go signal when the frame D swings 90° in a counterclockwise direction from the full to the dot-dash line position shown in FIGURE 3. When the frame D contacts with the stop arm 14, the Stop signal on the frame will parallel the edge 1 of the base A. A driver of an automobile driving in the direction of the arrow 18 in FIGURES 3 and 4 or to the left in FIGURE 1, will see the word Stop on the frame D when the frame is in contact with the arm 14. The frame E will be out of the vision of the driver and the Go sign will not be visible to him.

The L-shaped stop F also has a stop arm 16 extending at right angles to the stop arm 14 and paralleling the side edge 17 of the base A. The stop arm 16 limits the clockwise swinging of the frames D, E from the dot-dash line position in FIGURES 3 and 4, into the full line position in the same figures when the frame D strikes the stop arm 16. Since the frame E extends at right angles to the frame D, it will be seen that a driver in an approaching car and moving in the direction of the arrow 18 will see the Go sign on the frame E when the frame E contacts the arm 16. The frame D will be out of his view and the Stop signal will not be seen. I will now describe the novel manner for swinging the signal from Go to Stop and vice versa.

The Stop-Go signal D, E makes use of gravity in swinging about the nail 11 as a pivot. When the portable automobile stop signal is in normal position, as shown by the full lines in FIGURE 1, the nail 11 will have its axis aligned with the inclined axis 5 of the rod B. The nail 11 will therefore be inclined from the vertical and the Stop-Go signal frames D, E will swing like an arm with the frame E acting as a weight to swing the frame D in a clockwise direction until it strikes the stop arm 16. The device is placed on the garage floor 3 so that the edge 1 of the base A faces the driver in the approaching car and the nails C will incline the base A downwardly toward the driver. Only the bumper 20 of the car is shown, which would be moving into the garage from right to left in FIGURE 1 and toward the garage wall 19, as the car moves.

The full line position of the device in FIGURE 1 agrees with the top plan full line view of the device in FIGURE 3. The driver will see the frame E with the Go signal thereon. As the car moves toward the wall 19, the car bumper 20, see FIGURE 1, will strike the rod B and will swing it toward the dot-dash line position in the same figure. As the rod B is moved by the bumper, the rod will swing the base A counter-clockwise about the lower ends of the nails C as a fulcrum and will raise the base into the dot-dash line position in FIGURE 1. This will incline the rod B to the left of the vertical dot-dash line 4 and the nail 11 will likewise be inclined to the left of the line 4.

The frame E in acting as a weight on the frame D, will swing the latter frame in a counterclockwise direction about the nail 11 as a pivot until the frame D strikes the stop arm 14. The frame D will now be in full view of the driver in the car with the Stop signal viewable and the frame E will be swung out of view so the Go signal cannot be seen by the driver as shown by the dot-dash line position in FIGURE 4. The driver immediately knows that he must stop his car so that it will not strike the wall 19 or any other object that lies in the path being taken by the moving car.

When the driver moves his car away from the device, as when he leaves the garage, the device will return to the full line position shown in FIGURES 1 and 4. The frame E will again act as a weight in swinging the frame D as an arm about the pivot 11 in a clockwise direction in FIGURE 3 until the frame D strikes the stop arm 16. The frame E will now parallel the edge 1 of the base and the Go signal will again be visible when facing the base edge 1. The frame D will be out of view and so also will be the Stop signal.

In this simple way the device is operated by gravity as the rod B is moved into either of its two extreme positions. When the car bumper 20 moves away from the rod B, and the base A swings from the dot-dash line to the full line position in FIGURE 1, the base will be heavy enough to prevent any momentum of the rod B in swinging to the right from tilting the base on its edge 1 to raise the nails C above the floor 3.

In FIGURE 4 the Stop-Go signal D, E, is shown in two positions, but the extension 6 is shown in only one position and by the full lines. If the extension 6 were also shown rotated 90° in a dot-dash line position, the additional lines showing this would have a tendency to obscure the word Stop shown by the dot-dash lines. The nail 11 is omitted for the same reason.

I claim:
1. A portable automobile stop signal comprising:
   (a) a base;
   (b) an upwardly extending rod having its lower end supported by the base;
   (c) a fulcrum member projecting below the base and adapted to rest on the same supporting surface as the base; said fulcrum member causing said base to incline said rod at an angle from a vertical line that intersects the longitudinal axis of the rod at its juncture with said base;
   (d) the rod axis and said vertical line lying in a plane that parallels the longitudinal axis of a moving automobile as it approaches the base, and the normal position of said rod being inclined toward the driver in the moving automobile;
   (e) a pin carried by said rod and projecting above the upper end thereof, the axis of said pin paralleling the rod axis;
   (f) a Stop-Go signal mounted on said pin; and consisting of a pair of integral frames extending at right angles to each other;
   (g) the free edge of one of said frames having ears pivotally receiving said pin and the outer surface of the same frame having the signal Stop thereon; the opposite edge of the same frame having the other frame extending therefrom and at right angles thereto and provided with the signal Go on its outer surface;
   (h) a stop arm extending from said rod and limiting the swinging of said frames as a unit about said pin when said rod is inclined toward the driver in an approaching automobile and the frame with the Go signal faces the driver so as to lie within his vision; and
   (i) a second stop arm integral with said first stop arm and extending at right angles thereto and limiting the swinging by gravity of said frames as a unit with said pin when said rod is contacted by the automobile and said rod is inclined away from said automobile, and the frame with the Stop signal thereon faces the driver and lies within his vision.

2. The combination as set forth in claim 1: and in which
   (a) when the Go signal frame faces the driver, the other frame parallels the plane formed by said rod axis and said vertical line; whereby the Stop signal on said other frame will be hidden from the driver's vision; and
   (b) when the Stop-Go signal swings to cause the frame with the Stop signal to face the driver, the other frame with the Go signal parallels the plane formed by said rod axis and said vertical line so that the Go signal will be hidden from the driver's vision.

3. The combination as set forth in claim 1: and in which
   (a) said pin having a head;
   (b) one of said ears bearing against the underside of said head and having integral wings bearing against the opposite side of said head;
   (c) whereby said Stop-Go signal will be free to swing with said pin within the limits determined by said two stop arms while being held from longitudinal movement along said pin.

4. A portable automobile stop signal comprising:
   (a) a rectangular base;
   (b) an upwardly extending rod positioned near one end of and being supported by said base so that the rod axis is perpendicular to the plane of said base;
   (c) spaced apart fulcrum members extending from the underside of said base and being disposed near the opposite end thereof from the end disposed near said rod; said fulcrum members causing said base to be inclined with respect to a supporting surface and causing the rod axis to be inclined from a vertical line that intersects the rod axis at its juncture with said base;

(d) said rod axis and said vertical line lying in a plane that parallels the longitudinal axis of a moving automobile as it approaches said base; the normal position of said rod being inclined toward the driver in the moving automobile;

(e) a nail carried by said rod and having a portion of its shank and head projecting above the upper end of said rod, the axis of the nail shank paralleling the rod axis;

(f) a Stop-Go signal mounted on said nail and consisting of a pair of integral frames extending at right angles to each other;

(g) the free edge of one of said frames having ears pivotally receiving said nail and one of the ears engaging with the nail head to prevent longitudinal movement on the nail; the other surface of the same frame having the signal Stop thereon; the opposite edge of the same frame having the other frame extending therefrom and at right angles thereto and provided with the signal Go on its outer surface;

(h) a pair of stop arms integral with each other and supported by said rod near to said nail for limiting the swinging of said frames as a unit about said nail through an angle of 90°; said Stop-Go signal when in one extreme position causing the frame with the Go signal thereon to parallel the end of said base, the other frame with the Stop signal thereon extending at right angles to said base end;

(i) said Stop-Go signal when in the other extreme position causing the frame with the stop signal thereon to parallel the base end, the other frame with the Go signal extending at right angles to said base end;

(j) the normal position of said rod being inclined toward the base end disposed nearest to said rod; said rod when in this position causing said nail shank to be inclined so that the Stop-Go signal will swing by gravity about said nail to bring the Go signal frame parallel with the base end;

(k) said rod when moved by an automobile into an inclined position on the opposite side of said vertical line causing said nail shank to be inclined in the opposite direction so that the Stop-Go signal will swing by gravity with said nail to bring the Stop signal frame parallel with the base end.

5. The combination as set forth in claim 4: and in which (a) when the Go signal frame parallels the base end, the other frame extends at right angles to said base end and the Stop signal on this other frame is hidden from the automobile driver's vision; and (b) when the Stop signal frame parallels the base end, the other frame extends at right angles to said base end and the Go signal on this other frame is hidden from the automobile driver's vision.

No references cited.